United States Patent [19]

Lingley

[11] 3,749,412
[45] July 31, 1973

[54] MECHANICAL SHAFT SEAL

[76] Inventor: Ronald Lingley, One Continental Ct., Woburn, Mass. 01801

[22] Filed: May 10, 1972

[21] Appl. No.: 252,032

[52] U.S. Cl. ............................... 277/81 R, 277/96
[51] Int. Cl. ........................................... F16j 15/34
[58] Field of Search ................. 277/38–43, 81–96

[56] References Cited
UNITED STATES PATENTS
1,528,334  3/1925  Hurd ..................................... 277/81
2,247,505  1/1941  Kohler .................................. 277/81
2,374,353  4/1945  Jacobsen ............................... 277/81
3,311,382  3/1967  Dolhun ................................. 277/93

Primary Examiner—Herbert F. Ross
Assistant Examiner—Robert I. Smith
Attorney—C. Yardley Chittick, Robert A. Townsend et al.

[57] ABSTRACT

Rotary seal ring-stationary seal sleeve apparatus for frictionally sealing fluid filled, rotary shaft devices. A rigidly positioned, right-angular, alignment-holding rotary seal ring. Quick clamp-release means for positioning and locking the seal without shaft end wear or seal ring misalignment.

15 Claims, 3 Drawing Figures

PATENTED JUL 31 1973 3,749,412

MECHANICAL SHAFT SEAL

BACKGROUND OF THE INVENTION

1. Field of the Invention

This invention relates generally to apparatus for mechanically sealing pumps and the like rotary shaft devices, containing fluid under pressure, and wherein the pressure fluid is to be confined or sealed against escape between the stationary housing and the rapidly rotating shaft. The invention pertains more particularly to mechanical shaft seals of the type replacing conventional shaft packings, and effecting the pressure fluid seal at a radial contact interface between stationary-movable or relatively rotating, biased-together, frictionally engaged seal parts.

The pumps here concerned, such as in pulp mills, chemical plants and the like, are run at high shaft speeds, 24 hours a day, for as much as years at a time.

In such extreme wear applications the shaft seals may last for as long as 2 years if fitted with a carbon or the like replaceable facing at one side of the contact interface, or for as short as one month, if not so fitted. The metal-to-metal contact interface also is lubricated by a thin film of oil, as a result either of the fluid being pumped incorporating a lubricant in it, or of its being continuously supplied to the relatively rotating, radially juxtaposed seal surfaces through the housing gland from an outside source or supply.

The opposing faces of the seal parts engaged at the radial contact interface are spring biased, or yieldably closed together, but the tight seal of the pressure fluid is still to be attained subject to their constant relative rotation as desired, and with a merely metal-to- engagement of the contact faces of said seal parts.

Accordingly, a principal problem with the mechanical shaft seal devices such as here concerned is that the faces or surfaces of the stationary and rotary seal parts which are engaged at the radial interface must be, and must in their continuous operation remain:

a. precision polished, glassy flat; or extremely straight and smooth; and b. absolutely right angular, or perfectly aligned one with the other.

The radial face engaged, seal member end surfaces are initially machined, or precision lapped, to within one millionth of an inch (0.000,002 in.) of perfect flatness, it being found that a contact interface having or approaching that tolerance will hold the pressure fluid leakage within acceptable limits, and surface gauges of that precision being available to those skilled in the art.

It will be understood that where one of the seal member end faces which is engaged at the contact interface wears non-flat substantially towards, or in any event to exceed, an absolute limit of, say, 10 millionths of an inch (0.000,010 in.) tolerance, that will produce an intolerable degree of leakage, and require replacement of the seal, or at least of the seal member whose contact face has worn excessively non-flat.

Importantly, also, any departure from, or exceeding of, the initial, design, or standard tolerance of, say, within one millionth of an inch of absolute flatness will itself substantially accelerate the rate of wear of the seal surfaces engaged at the contact interface, similarly as will any departure from right angularity of, or transverse or radial alignement of, those seal surfaces.

Accordingly, the problem to be solved, in the design and construction of mechanical shaft seals such as here concerned, is the provision, by a mechanical apparatus or assembly which is of low cost, relatively few parts, and readily uniform manufacture, of contact interface engaged members so constructed and arranged that the interface surfaces are subject to the last possible wear in use, whereby the shaft seal will be the longest lasting, and the pump will undergo the least fluid leakage, and down time for seal repair or replacement.

DESCRIPTION OF THE PRIOR ART

Figure 1:
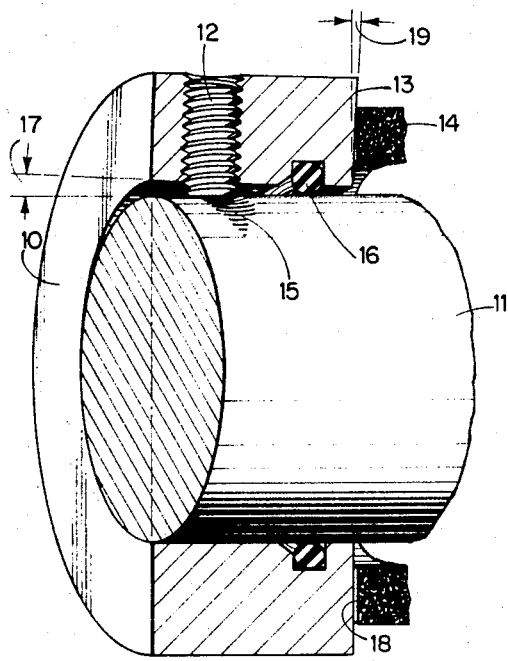
FIG. 1 shows a prior art seal.

FIG. 1 represents the prior approach to the problem of Van Vleet U.S. Pat. No. 3,068,012, wherein the rotary seal ring 10 is clamped to the shaft 11 by a single set screw 12, to position or fix its fluid sealing end face or contact surface 13 for bearing against the mating end face of stationary seal ring 14.

In the use and application of the just described arrangement it is found that:

1. The tightening down of the set screw 12 produces shaft surface wear, as indicated at 15, making the shaft at that point, or in that radius, non-cylindrical, or out of round. This described set screw digging thereinto, as at 15, not only causes the indicated damage to the pump shaft, but also produces or contributes to excessive or unacceptable leaking of the shaft seal, upon every resetting of the seal ring 10 otherwise than with the screw 12 reseated as before in relation to the wear spot 15.

2. The clamping up of the rotary seal ring 10 by the single set screw 12 serves to rock or cant the seal ring about the O-ring 16, rendering the seal ring 10 non-aligned with the shaft 11, as shown exaggerated by the arrow 17, and rendering the end or wear face or surface 13 non-right-angular, or mis-aligned with the opposing, non-rotary seal sleeve 14 wear face or surface 18, of the transverse or radial contact interface, and as shown exaggerated by the arrow 19.

The FIG. 1 arrangement, then, is firm, but destructive of the shaft 11, and inherently subject to wear-accelerating misalignment of the contact interface, this from the clamping or tightening of, and also from the rotational drag on, the rotary seal ring 10 and set screw 12. This results, of course, in too rapid wear and excessive leakage of the shaft seal, too frequent shut downs of the pump, and too costly replacement or repair of the shaft seal.

Figure 2:
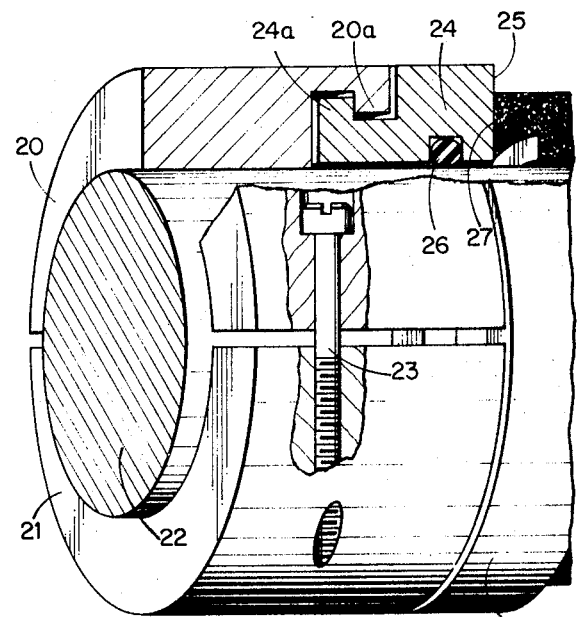
FIG. 2 shows another prior art seal.
Figure 3:
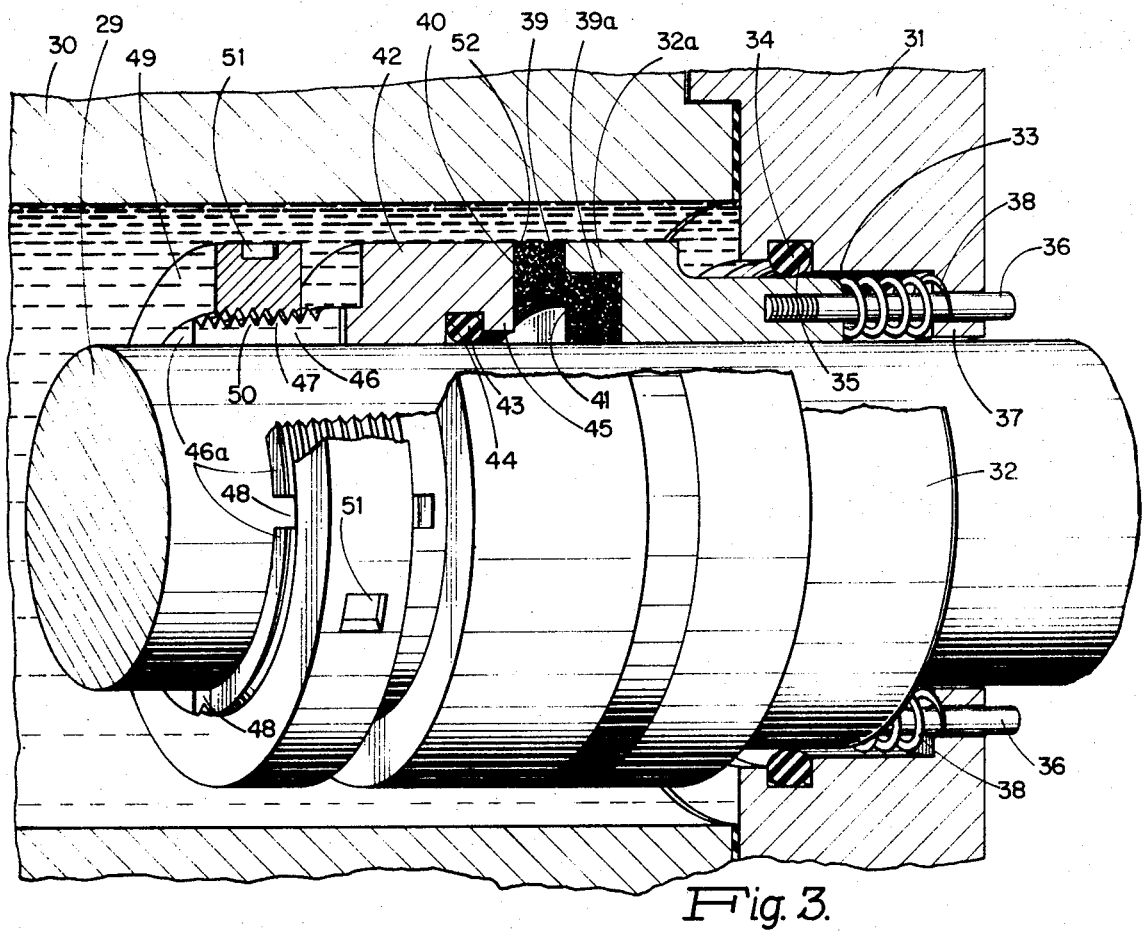
FIG. 3 illustrates a preferred embodiment of the mechanical shaft seal of this invention.

FIG. 2 shows the prior approach to the problem of Van Vleet U.S. Pat. No. 3,188,095, and wherein the rotary seal ring is split into the clamping halves 20, 21 which are clamped to the shaft 22 by an oppositely or either side positioned pair of bolts 23 with lessened misalignment and shaft wear than attributable to the FIG. 1 arrangement. However, to provide the required, integral wear surface 25, a contact ring 24 is made loosely fitting with the ring halves 20, 21, as at the interlocking flanges 20a, 24a, whereby the contact ring 24 is free to float on O ring 26.

In use and application the FIG. 2 arrangement is found, under continuously frictional engagement of contact ring wear surface 25 with opposing wear surface 27 of stationary seal sleeve 28, to be susceptible to vibration and misalignment and so to evoke the incipient tendency to accelerated wear to excessively non-flat condition of the contact interface, and hence to suffer the same adverse consequences of seal leakage, pump take down, and parts repair or replacement as heretofore ascribed to the FIG. 1 arrangement.

The FIG. 2 form of shaft seal also is more costly, having the indicated greater number of parts. And, unless the clamping halves 20, 21 are machined very precisely, they are found to damage the pump shaft, in that the rotary torque or drag of the radial contact interface is reflected at the shaft surface, in the case of imprecisely machined clamping rings, in shaft damage through their engaging and wearing the shaft at certain points only.

It will be appreciated that to reduce or minimize the cocking or canting of the ring 10 by the screw 12 in the FIG. 1 arrangement requires machining the ring 10 to fit over the shaft 11 to within extremely close, very difficult to maintain tolerance limits, which extremely close ring-shaft interfitting introduces also problems with the desired ready and accurate adjustment and positioning of the mechanical seal on the pump shaft.

This difficulty is lessened, in the FIG. 2 arrangement, but at the expense of introducing an additional element, the floating ring 24, which is deliberately made free to rock, in order that there may be provided a wear surface 25 thereon which is capable of fitting squarely against the opposing wear surface 27 of the stationary seal sleeve 28, for the required radial alignment or transverse parallelism of said wear surfaces at and to form an initially tight and wear resistant contact interface.

The FIG. 2 resort to complicating the rotary sleeve construction by the introduction of an additional element is found, as hereinbefore mentioned, not only to increase the cost and complexity of its manufacture, but also, as with the FIG. 1 arrangement, to introduce difficulties adversely affecting, and more particularly yielding the unwanted acceleration of, and hence excessive leakage by and too frequent replacement of, the seal ring-seal sleeve wear surfaces at the contact interface. Particularly when the pump is shut down or started up, the radial wear faces 25, 27 are apt to be cocked. More generally, and as will be obvious, the floating contact ring surface 25, and therefore the interface 25, 27, is susceptible, at any time in its generally constant running use, of being upset, by vibration or by variation in fluid pressure, from an aligned to a non-aligned, wear-inducing-and-accelerating condition or position.

SUMMARY OF THE INVENTION

The described shaft seal problem is uniquely solved by this invention through the provision of a novel mechanical seal apparatus wherein is had both:

a. a perfect alignment of the rotary seal ring with the rotary shaft end; and perfect right angularity of the seal ring end surface at the contact interface; and this without injury to or localized wear of the pump shaft; and b. rigid, firm positioning, mounting and retention of said seal ring end face in the required right angularity or transverse parallelism at the contact interface, preventing deviation of the wear surfaces at the contact interface, and the resultant acceleration of their wear to an unacceptably out-of-flat, excessively leaky interface condition.

In the preferred embodiment, the invention employs a seal sleeve sealingly supported from the pump gland and for axially biasing towards the seal ring. And the latter is adapted for aligned mounting on, and shaft-wear-free, shaft-alignment-retaining clamping to, the shaft end. Quick attach-release clamping ring means are also provided for releasably and adjustably clamping the seal ring to, and in selected or adjusted positions on, the pump shaft end.

The original solution to the described shaft seal problem which is novelly provided by this invention resides more particularly in the provision of an improved mechanical seal construction which at one and the same time:

a. provides a rotary seal ring which is, and whose radial wear surface or face thereby is, rigid, and firm, and free from susceptibility to vibration or pressure, or to misalignment for any reason with the opposing contact surface of the stationary seal sleeve; and b. assures always the wanted seal ring alignment with the pump shaft, and this without the necessity of machining to impractically close tolerance therewith, and without the risk of injury or damage to the shaft.

The present invention, then, avoids the seal ring canting and pump shaft damaging problems associated with the FIG. 1 arrangement, and eliminates the incipient liability to self-generating wear that handicaps the FIG. 2 arrangement, while being characterized as well by much greater ease and lesser cost of production than for the more complicated, difficult to manufacture and use mechanical seal form of FIG. 2.

DESCRIPTION OF THE PREFERRED EMBODIMENT

In accordance with the invention, and for mechanically sealing the shaft 29 of a fluid pump or the like having a fluid filled housing 30 closed about the shaft end by a stuffing box or gland 31, there is provided a rotationally stationary sleeve 32 received in a flange recess 33 and having a fluid tight seal with the gland through radially oversized O-ring 34 compressed between the sleeve 32 and annular gland recess 35 for said O-ring 34, which recess 35 may be axially oversized to permit rolling of O-ring 34 with and facilitating the axial shifting of sleeve 32.

Sleeve 32 is guided for axial, non-rotative movement within housing 30 and over shaft 29 by a radially distributed, circumferentially balanced plurality of sleeve end mounted pins 36 extending axially outward from sleeve 32 and passed through mating holes in a gland carried bearing means, hub or flange 37, the same closing outwardly the recess 33, and thereby the housing 30, about the shaft seal.

The outer end of sleeve 32 and the gland flange 37 define opposing end walls between which are compressed coil springs 38 received over the pins 36, which spring means 38 serve to resiliently bias the sleeve 32 inwardly, to maintain a compression surface against which the rotary seal ring may be set up to establish the contact interface, as hereinafter described.

Axially-shiftable, rotationally stationary sleeve 32 has detachably mounted on its other or inner end a carbon or other ring contact 39 providing a relatively soft, right angularly disposed, precision lapped end wear surface 40. Sleeve 32 also is annularly recessed to define an outer flange 32a surrounding the mating, indenting rib or shoulder 39a of the wear ring, for tight, detachable interfitting of the parts.

The radial end face or wear surface 40 of ring 39 will be understood to define one surface of the contact interface. The pump fluid F is thus shown as sealed by the O-ring 34, and as excluded thereby from the space defined by the inner recess 41 in the wear surface 40 of the contact ring 39.

Further in accordance with the invention, an integral, one-piece, rotary seal ring 42 is received over shaft 29 inwardly of stationary sleeve 32 and ring 39, and is sealed to said shaft 29 by O or other elastic ring 43 compressed in recess 44, whose outer wall 45 may be reduced by seal ring bore enlargement thereat for easier admittance and removal of the O-ring 43.

In its main body the rotationally movable, axially stationary shaft seal ring 42 has a substantial mass or thickness affording it wanted stability and rigidity with the shaft 29, and defining therefor an outer periphery conveniently continuous with that of the rotationally stationary, axially movable sleeve 32 and ring 39.

Inwardly of its aforesaid main body portion the seal 42 is provided with a reduced, integral, annular extension or stem 46.

The stem extension 46 is formed, as shown, with a radially outer convexity, or slope or taper enlarging that from the end or extremity towards the base or root thereof. Thread forming means, herein the integrally cut screw threads 47, helically wrap, or spirally serrate, the specified taper in the outer surface of stem 46.

The extension 46 also is axially cut by a balanced plurality of equidistant recesses or kerfs 48, the same extending substantially the full length of the extension. The seal ring 42 is of a stainless steel or similar material, and in the extension 46 of a thickness such as imparts to the segments 48 the characteristic of resilient or spring fingers.

The kerfs 48 are thus predeterminedly of a width to allow the fingers 46a to be drawn about or clamped against the shaft 29, and in that reduced from the sleeve 42 inside diameter to the shaft 29 outside diameter without that reducing being impeded by the tangential coming together first of the kerf 48 side walls.

The invention further comprises an integral, rigid, relatively narrow clamping ring 49 having a cylindrical or nontapered radially inner wall or bore helically wrapped or spirally serrated by thread forming means, herein the integrally cut threads 50, mating with the extension threads 47, and of an inside mean diameter conformant to the outside mean diameter of the extension 46 threads 50 at the end or extremity thereof. The threads 47, 50 are thus readily or immediately engaged upon application of the clamping ring 49 to said end or extremity of the extension 46, and with the spring fingers 46a in their normal or free standing, undistorted condition of some slight but deliberate clearance with or about the shaft 29, the extension 46 having a radially inner wall which is axially continuous, as shown, with the inner wall of the main body of the seal ring 42.

In installing the invention seal, seal ring 42 is positioned at the desired point at or towards the end of the shaft 29 irrespective of the described prior art shaft-seal diameter tolerance or clearance problems, the elimination thereof enabling the ready and non-damaging axial sliding of the ring 42 on the shaft 29, and for fixing thereon in any random or indifferent position of rotational adjustment.

To clamp the ring 42 in the wanted axial position of initial closing against ring 39 and springs 38, and of compressive holding thereby of the contact interface, requires simply the winding or turning up of the ring 49 on the extension 46, the described taper thereof causing the segments or spring fingers 46a to be tightly clamped against the shaft 29, as shown.

For convenient rotation thereof, ring 49 may be provided with outer wall indents 51 or the like non-cylindrical or non-round means or formations adapting it for rotative manipulation by a torque tool, such as a spanner wrench.

At the contact interface, or at its outer end, ring 42 is provided with the right angularly disposed, precision lapped wear surface 52.

In the simple, rapid clamping manipulation of the invention shaft seal assembly, it will be apparent, the seal ring 42 is:

a. rigidly positioned;

b. clamped always in axial alignment with the shaft 29, and therefore with wanted right angularity of its contact surface 52; and c. maintained in the indicated condition of alignment of its contact surface 52 with the opposing wear surface 40 (of the contact interface between the rings 39,42) without risk of damage or injury to the shaft 29, from the clamping of the fingers 46a, or from the drag of or frictional interface between the rotary-stationary, contact surfaces 52,40.

The invention is thus seen to provide a simple, low cost shaft seal of relatively few parts, without difficult or excessively close tolerance machining requirements, which is free from damage to the pump shaft, and which provides a firm and always right angularly aligned contact interface sealing the pump fluid F with only tolerable leakage, and with freedom from the tendency to misalignment at the contact interface (whether by canting of the seal ring or by vibration of the contact ring) that has heretofore plagued the art; that more particularly has caused interface wear to initiate, and inevitably to accelerate; and that has resulted in excessive or intolerable leakage such as requires shut down of the pump and take down of and repair or replacement of the shaft seal.

Accordingly, the mechanical seal hereof is seen to be economic both in its low initial cost and in its longer lasting in use, by holding the flatness of its contact surface 52,40 to within tolerable or acceptable leakage controlling limits for substantially longer periods of use than heretofore.

Those skilled in the art will appreciate that still further economies are realized from the invention in the less frequently occasioned down time of the pump, and replacement of the seal wear parts.

I claim:

1. A mechanical seal for pumps and the like fluid containing, rotary shaft devices having a housing defining a fluid chamber closed about the shaft end, said seal of the class sealing the fluid in said chamber at a radial, rotary-stationary seal member contact interface and comprising, in combination:

a rotationally stationary, axially movable seal sleeve to be received within said housing and over said rotary shaft end;

means for circumferentially sealing between said seal sleeve and said housing;

housing-carried bearing means located axially outwardly of and opposite to said seal sleeve;

axially disposed, circumferentially balanced spring means engaged between said seal sleeve and bearing means, said spring means resiliently biasing said seal sleeve axially inward;

a radial end face on the inner end of said seal sleeve said end face constructed and arranged as a right angularly disposed, precision lapped surface for engagement at said contact interface;

an axially stationary, rotationally movable seal ring received over said shaft end inwardly of said seal sleeve, said seal ring having an inside diameter conforming to the shaft outside diameter to within a tolerance fitting the ring snugly to while allowing it to slide readily over the shaft end;

means establishing a fluid tight seal between said seal ring and shaft end;

an annular, reduced, stem extension integrally formed on said seal ring, said stem extension projecting axially inwardly of the main body of said seal ring and having an inner wall continuous with the inner wall of said main body of said seal ring;

a taper formed on the outside of said stem extension and thickening that from the end toward the root thereof;

thread forming means spirally serrating said taper;

spaced, axial, kerf formations axially recessing said stem extension and dividing that into spring finger segments;

a radial end face on the outer end of said ring, said end face constructed and arranged as a right angularly disposed, precision lapped surface for engagement at said contact interface;

an integral, rigid, relatively narrow clamping ring; and thread forming means spirally serrating the inner wall of said clamping ring, said seal ring and clamping ring thread forming means mated one to the other, and said clamping ring having an inside diameter fitting the outside diameter of said stem extension at the outer extremities of said spring fingers when relaxed, whereby the winding of said clamping ring on said stem extension serves to radially contract said spring fingers to rigidly clamp said seal ring to said shaft without disaffecting its alignment therewith.

2. The apparatus of claim 1, and torque-tool engagable means on said clamping ring adapting that to be manipulated rotatively for its said winding onto said stem extension.

3. The apparatus of claim 1, wherein said spring means comprise a plurality of equidistantly distributed coil springs.

4. The apparatus of claim 1, and axial pins on one and pin receiving recesses on the other of said seal sleeve and housing-carried bearing means, said pins and recesses extending and telescoping upon relative axial movement of said seal sleeve and housing, and thereby securing said seal sleeve against rotation relative to said housing, and against axial misalignment with said shaft end.

5. The apparatus of claim 4, wherein said spring means are received over said pins.

6. The apparatus of claim 1, wherein said means for establishing a fluid tight seal between said seal ring and shaft end comprise
an internal annular recess in said seal ring; and
an O-ring received in said recess and compressed and sealing between said seal ring and shaft end.

7. The apparatus of claim 1, and
a contact ring detachably mounted at the inner end of said seal sleeve, and
said radial inner end face of said seal sleeve being formed on said contact ring.

8. The apparatus of claim 7, wherein said contact ring is formed of a softer material than that of said seal ring and whereby principally to incur the wear at said contact interface.

9. The apparatus of claim 7, wherein said seal sleeve and contact ring are rigidly-releasably engaged at annular, interfitting rib and recess formations.

10. In a mechanical seal for pumps and the like fluid filled, housing enclosed, rotary shaft devices, for rotary sealing to an axially biasing, inner end wear face presenting seal sleeve carried by and rotationally stationary with the housing, the combination comprising
an integral, one piece seal ring;
a radial outer end wear face on said seal ring, said wear face for opposing to and rotary-stationary friction sealing with said inner end wear face of said seal sleeve;
a cylindrical bore defining the radially inner face of and extending the full length of said seal ring,
said bore dimensioned to fit said ring slidably and also snugly over said rotary shaft, whereby said sealing ring is movable over while held in axial alignment with the shaft end;
an annular recess formed in said bore proximate the outer end of said seal ring;
elastic seal means received in said recess and compressed between said seal ring and shaft end to effect a fluid tight seal therebetween;
an integral stem extension on and projecting axially inwardly of said seal ring, said stem extension continuing the bore wall of and having reduced thickness relative to the main body of said seal ring;
a threaded taper formed on the radially outer wall of said stem extension;
means forming axial recesses in said stem extension and defining the thereby separated segments thereof as spring fingers;
a clamping ring; and
a threaded bore on said clamping ring, said threaded bore proportioned to mate with said threaded seal ring taper at the outer extremity thereof, whereby the rotating of said clamping ring on said stem extension serves to contract said spring fingers radially about, and to securely clamp said seal ring to, said shaft end.

11. The apparatus of claim 10, and means adapting said clamping ring for rotation by a torque tool.

12. The apparatus of claim 11, wherein said adapting means comprise spanner-wrench-receiving recesses in the outer wall of said clamping ring.

13. The apparatus of claim 10, wherein said stem extension splitting means comprise a balanced plurality of axial recesses, said recesses formed to a width admitting the tangential closing together of said spring fingers that accompanies their radial contracting to clamp said seal ring to said shaft end.

14. The apparatus of claim 10, wherein said fluid tight seal effecting means comprise an O-ring.

15. The apparatus of claim 1, wherein said circumferentially sealing means comprises
a seal seat in said seal sleeve; and
an elastic seal ring in said seal seat and circumferentially engaging said housing.

* * * * *